United States Patent [19]

Ma

[11] Patent Number: 5,327,322
[45] Date of Patent: Jul. 5, 1994

[54] BUILT-UP PEN BASE COMPUTER

[76] Inventor: Hsi-Kuang Ma, 4F, No. 48, Sec. 2, Chung Cherng Road, Taipei, Taiwan

[21] Appl. No.: 40,257
[22] Filed: Mar. 30, 1993
[51] Int. Cl.$^5$ .......................... H05K 7/10; G06F 1/16
[52] U.S. Cl. .................................... 361/681; 361/683; 345/905
[58] Field of Search .................................. 361/679–686; 312/223.2; 248/917–923; 364/708.1; 345/169, 905; 439/928

[56] References Cited

U.S. PATENT DOCUMENTS 5,030,128  7/1991  Herron et al. .................. 361/683 X
5,100,098  3/1993  Hawkins ........................ 361/683 X Primary Examiner—Leo P. Picard
Assistant Examiner—Michael W. Phillips
Attorney, Agent, or Firm—Bacon & Thomas

[57] ABSTRACT

A built-up pen base computer including a base, which comprises a flush type LCD mounted on a mother board and an IC card connected to the mother board at one side, and a case fitted into a rectangular bottom frame on the base and locked by spring-supported keys to carry a set of computer peripheral equipment being respectively and electrically connected to a connector detachably connected to a connector on the mother board, the rectangular bottom frame having a slot aligned with the disk slot of a floppy disk drive fastened inside the case.

3 Claims, 1 Drawing Sheet

BUILT-UP PEN BASE COMPUTER

BACKGROUND OF THE INVENTION

The present invention relates to pen base computers of the type disclosed in related application Ser. No. 08/031,992, and more particularly to a detachable pen base computer the main parts of which can be separately detached for repair and replacement.

A variety of portable computers have been proposed, and widely accepted for the advantage of mobility. A pen base computer is a newly developed compact computer which has an LCD for graphic input through a pen. Because the keyboard input device is eliminated, the size of a pen base computer is greatly reduced. Since a pen base computer is very small (may be so small that can be held in the palm), the master board and the LCD thereof may be damaged easily when frequently opening and closing the outer shell (opening the outer shell may cause a static electricity to happen, which will affect the operation of the electronic elements therein).

The inventor of the present invention invented a sliding box type pen base computer under U.S. Pat. No. 5,193,051 which eliminates the aforesaid problems. The sliding box type pen base computer according to U.S. Pat. No. 5,193,015 comprises a base and a sliding box, in which the base includes a mother board and a liquid crystal display supported on two longitudinal side stands with a receiving chamber defined therein to receive the sliding box. The sliding box is made to slide in and out of the base, and includes a battery box, a power supply unit, a floppy disk drive, and a hard disk drive on the inside surrounded by a vertical peripheral wall and electrically connected to the base. The present invention provides an alternative which also effectively eliminates the aforesaid problems.

BRIEF DESCRIPTION OF THE DRAWING

The only drawing of the present invention is FIG. 1 showing an exploded view of the preferred embodiment of the pen base computer of the present invention.

DETAILED DESCRIPTION OF THE PREFERRED EMBODIMENT

Figure 1:
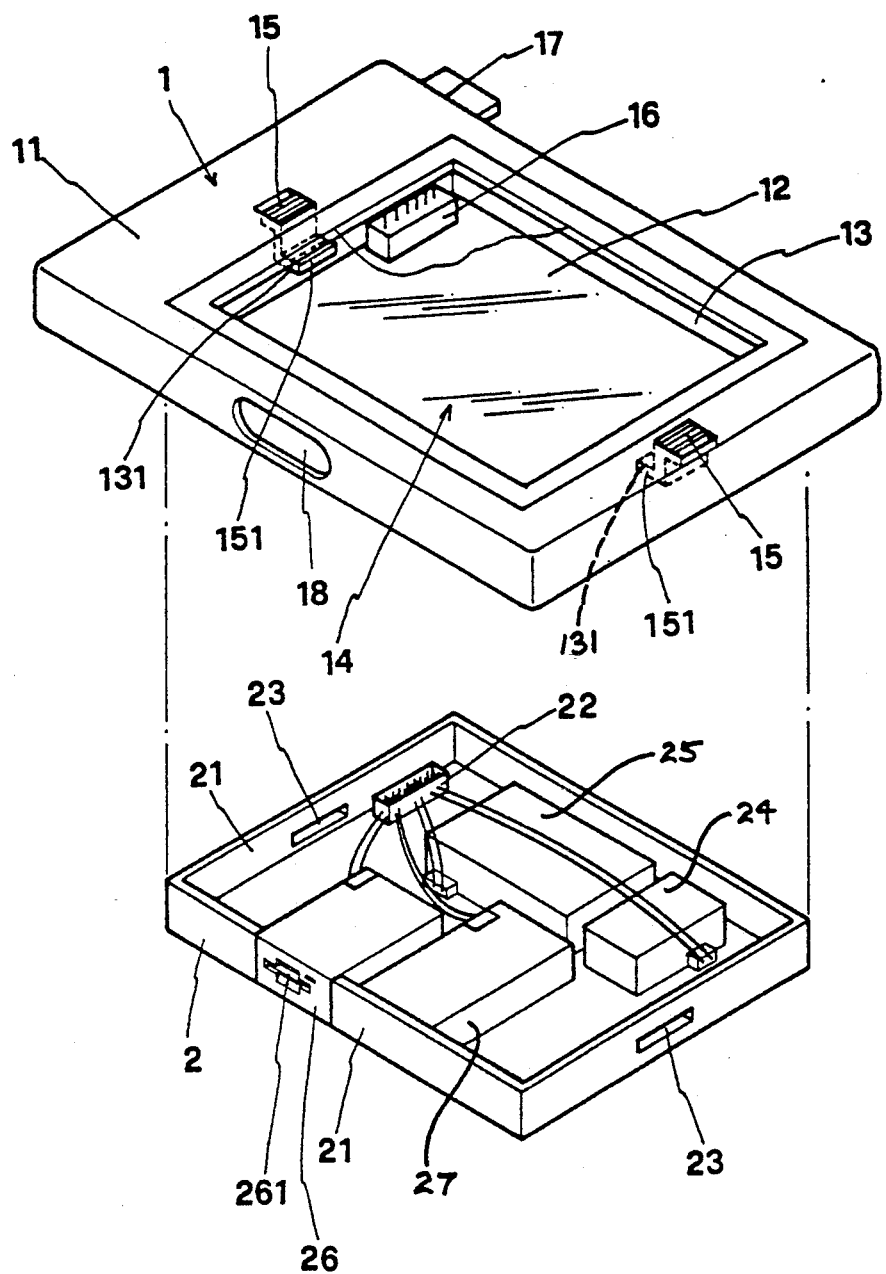

Referring to the annexed drawing in detail, a pen base computer constructed in accordance with the present invention is generally comprised of a base 1, and a rectangular case 2. The base 1, which is made in a flat, rectangular shape, is comprised of a mother board 11 having a flush type liquid crystal display (LCD) 12 at the top. The mother board 11 comprises a rectangular bottom frame 13 surrounding a rectangular chamber 14, into which the case 2 fits. The rectangular bottom frame 13 includes two key holes 131 at the middle on two opposite short sides thereof, into which the hooked ends 151 of a pair of spring-supported keys 15 are inserted, and a connector 16 at a suitable location. The connector 16 has its contacts vertically projecting downwards for connecting a matching connector 22 on the case 2. The mother board 11 further comprises a slot 17 at one side for inserting a variety of IC cards. A slot 18 is made on the rectangular bottom frame 13, through which a floppy disk can be inserted into the disk slot 261 on a floppy disk drive 26, which is fastened to the case 2.

The case 2 is made in a flat rectangular shape and is detachably fitted into the rectangular chamber 14 within the rectangular bottom frame 13 of the mother board 11 to carry a battery box 24, a power supply unit 25, a floppy disk drive 26, a hard disk drive 27, etc. and the related accessories, which are all respectively connected to the common connector 22, which has its contacts disposed vertically upwards for electrical connection to the downward contacts of the connector 16 on the mother board 11 when the case 2 fits into the rectangular chamber 14. The case 2 has two lock holes 23 on a pair of opposed peripheral upright walls 21 thereof and corresponding to the key holes 131 on the rectangular bottom frame 13. Inserting the case 2 into the rectangular chamber 14 causes backward movement of the hooked end 151 of each spring-supported key 15. Once the case 2 has been completely fitted into the rectangular chamber 14, the hooked end 151 of each spring-supported key 15 automatically engages a respective lock hole 23 to lock the case 2 beneath the LCD 12. Pressing the spring-supported keys 15 causes backward movement of the hooked ends 151, and therefore permits case 2 to be removed from the base 1.

Because the case 2 can be conveniently detached from the base 1, the major parts of the pen base computer can be separately dismantled for repair. Further, the arrangement of the case 2 allows different devices such as CD-ROM, TV tuning device, etc., to be alternatively and conveniently replaced.

While only one embodiment of the present invention has been shown and described, it will be understood that various changes can be made without departing from the spirit and scope of the invention.

What is claimed is:

1. A pen base computer comprising:
   a base including a mother board and a flush mounted liquid crystal display on a top of said mother board, said mother board including a rectangular bottom frame surrounding a rectangular chamber, two key holes at the middle of two opposite short sides of said rectangular bottom frame, two spring-supported keys respectively engageable within said key holes, a first connector and a slot at one side for inserting an IC card; and
   a case fitted into said rectangular chamber for carrying computer peripheral equipment, said case including a second connector for electrically connecting the peripheral equipment carried thereon to the first connector on said mother board, and two opposite lock holes into which said spring-supported keys are releasably engaged to lock said case inside said rectangular bottom frame.

2. The pen base computer of claim 1 wherein said case is adapted to accept a power supply unit, a battery box, a floppy disk drive, a hard disk drive, a CD-ROM, or a TV tuning device.

3. The pen base computer of claim 1 wherein said rectangular bottom frame of said base further includes a slot for alignment with the disk slot of a floppy disk drive contained within the case.

* * * * *